(12) United States Patent
Burnham et al.

(10) Patent No.: US 7,484,026 B2
(45) Date of Patent: Jan. 27, 2009

(54) SYSTEM AND METHOD FOR MEDIA DAMAGE PREVENTION ON A PORTABLE PLAYER

(75) Inventors: Robert J. Burnham, Novi, MI (US); George J. DeHelian, Jr., Roseville, MI (US); John A. Mecca, Oakland Township, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 228 days.

(21) Appl. No.: 11/287,687

(22) Filed: Nov. 28, 2005

(65) Prior Publication Data

US 2007/0300002 A1 Dec. 27, 2007

(51) Int. Cl.
*G06F 13/00* (2006.01)
*G11B 23/03* (2006.01)
(52) U.S. Cl. ............... 710/303; 720/719; 720/732
(58) Field of Classification Search ............ 710/303; 720/719, 732; 369/30.64
See application file for complete search history.

(56) References Cited

U.S. PATENT DOCUMENTS

| | | | | |
|---|---|---|---|---|
| 4,098,510 A | * | 7/1978 | Suzuki et al. | 720/626 |
| 4,507,768 A | * | 3/1985 | Ikedo et al. | 720/624 |
| 4,730,291 A | * | 3/1988 | Ikedo et al. | 369/30.83 |
| 4,737,945 A | * | 4/1988 | Yamazaki et al. | 369/30.85 |
| 4,995,027 A | * | 2/1991 | Aoyagi et al. | 720/626 |
| 5,093,818 A | * | 3/1992 | Suzuki | 369/30.83 |
| 5,181,197 A | | 1/1993 | Sugie et al. | |
| 5,323,291 A | * | 6/1994 | Boyle et al. | 361/686 |
| 5,596,728 A | * | 1/1997 | Belmont | 710/304 |
| 5,832,237 A | | 11/1998 | Lee | |
| 5,935,244 A | | 8/1999 | Swamy et al. | |
| 5,974,016 A | * | 10/1999 | Andrews et al. | 720/626 |
| 6,005,767 A | * | 12/1999 | Ku et al. | 361/681 |
| 6,115,247 A | * | 9/2000 | Helot | 361/686 |
| 6,119,237 A | * | 9/2000 | Cho | 713/300 |
| 6,147,596 A | | 11/2000 | Tsuchiya et al. | |
| 6,219,323 B1 | * | 4/2001 | Fukatsu et al. | 720/650 |
| 6,285,635 B1 | * | 9/2001 | Watanabe et al. | 369/44.27 |
| 6,392,878 B1 | | 5/2002 | Noh | |
| 6,418,013 B1 | | 7/2002 | Broder et al. | |
| 6,443,574 B1 | * | 9/2002 | Howell et al. | 353/13 |
| 6,549,490 B1 | * | 4/2003 | Howarth | 369/30.27 |

(Continued)

FOREIGN PATENT DOCUMENTS

JP 61250870 A 11/1986

(Continued)

OTHER PUBLICATIONS

Delphi Grundig, Mobile Multimedia and Car Audio, High-Tech-Entertainment For On the Road, Aug. 2004, pp. 1-21.

*Primary Examiner*—Paul R Myers
(74) *Attorney, Agent, or Firm*—Brinks Hofer Gilson & Lione (57) ABSTRACT

The system includes a removable entertainment device including an information retrieval device. The information retrieval device is configured to receive removable storage media. The removable entertainment device includes a controller in electrical communication with the information retrieval device to retract the media into the information retrieval device when the controller receives a signal indicative that the removable entertainment device will be moved. Such signals may include a screen closure sensor, a movement sensor, or a player supported sensor.

16 Claims, 4 Drawing Sheets

U.S. PATENT DOCUMENTS

| | | | |
|---|---|---|---|
| 6,633,454 B1 | 10/2003 | Martin et al. | |
| 6,885,552 B2 | 4/2005 | Mullen et al. | |
| 6,892,385 B2 * | 5/2005 | Kimikawa et al. | 720/631 |
| 7,139,870 B2 * | 11/2006 | Kelly et al. | 711/112 |
| 2003/0216846 A1 | 11/2003 | Chang | |
| 2004/0061995 A1 * | 4/2004 | McMahon | 361/681 |
| 2004/0088465 A1 | 5/2004 | Bianchi | |
| 2004/0120112 A1 | 6/2004 | Mullen et al. | |
| 2004/0194154 A1 | 9/2004 | Meadors et al. | |
| 2004/0227861 A1 | 11/2004 | Schedivy | |
| 2004/0228622 A1 | 11/2004 | Schedivy | |
| 2004/0252397 A1 | 12/2004 | Hodge et al. | |
| 2005/0047081 A1 * | 3/2005 | LaPorte et al. | 361/686 |
| 2005/0053365 A1 | 3/2005 | Adams et al. | |
| 2005/0083486 A1 | 4/2005 | Johnson | |
| 2005/0110913 A1 | 5/2005 | Vitito | |
| 2005/0140084 A1 | 6/2005 | Lee | |
| 2006/0148577 A1 * | 7/2006 | Vitito | 463/46 |
| 2006/0161713 A1 * | 7/2006 | Belady | 710/303 |
| 2006/0010458 A1 | 1/2008 | Georgis | |

FOREIGN PATENT DOCUMENTS

| | | |
|---|---|---|
| JP | 08035370 A | 2/1996 |
| JP | 2001202764 A | 7/2001 |
| JP | 2004199815 A | 7/2004 |
| WO | WO 9918727 A1 * | 4/1999 |

* cited by examiner

SYSTEM AND METHOD FOR MEDIA DAMAGE PREVENTION ON A PORTABLE PLAYER

BACKGROUND

1. Field of the Invention

The present invention generally relates to a system and method to prevent media damage for a dockable system.

2. Description of Related Art

More commonly, dockable electronic equipment such as laptops, portable DVD players, and CD players are using slot load CD or DVD mechanisms. Slot load mechanisms are more prone to damaging disks or media, if the device is moved or undocked with the disk protruding from the mechanism slot. Media damage is of particular concern, if the slot mechanism is on the side of the portable electronic equipment. Further, some docking stations cover the sides of the electronic equipment such that the media must be loaded into the slot mechanism through a hole in the docking station. In such scenarios, attempting to dock or undock the player while a disk is protruding from the player will result in damage to the disk, damage to the slot mechanism, or even damage to the player.

In view of the above, it is apparent that there exists a need for an improved system and method to prevent media damage for a dockable system.

SUMMARY

In satisfying the above need, as well as overcoming the enumerated drawbacks and other limitations of the related art, the present invention provides a system and method to prevent media damage for a dockable system.

The system includes a removable entertainment device including an information retrieval device. The information retrieval device is configured to receive removable storage media. The removable entertainment device includes a controller in electrical communication with the information retrieval device to retract the media into the information retrieval device when the controller receives a signal indicative that the removable entertainment device will be moved. Such signals may include a screen closure sensor, a movement sensor, or a player supported sensor. Further, the controller is in communication with a docking station that is configured to receive the removable entertainment device. The docking station is configured to prevent release of the removable entertainment device if the information retrieval device is ejecting or the removable storage media is protruding from the information retrieval device. The system may also provide a audio or optical warning if the controller receives a signal indicative that the removable entertainment device will be moved, while the information retrieval device is ejecting or the removable storage media is protruding from the information retrieval device.

Further objects, features and advantages of this invention will become readily apparent to persons skilled in the art after a review of the following description, with reference to the drawings and claims that are appended to and form a part of this specification.

DETAILED DESCRIPTION

Figure 1:
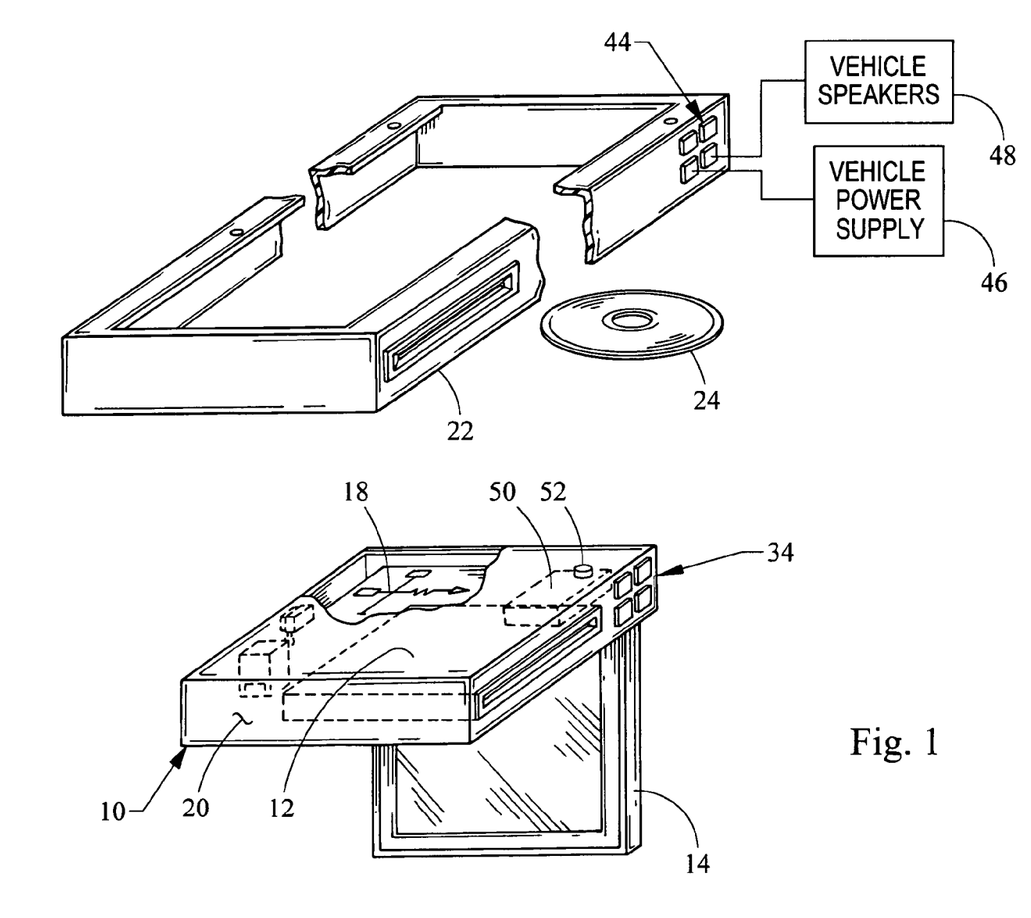
FIG. 1 is a perspective view of a dockable media player embodying the principles of the present invention.

FIG. 1 illustrates a removable entertainment device, generally indicated in the figures at reference numeral 10, in accordance with one embodiment of the present invention. The removable entertainment device 10 includes an information retrieval device 12, a video display screen 14, electronics 18, a housing unit 20, and at least one vehicle docking station 22. The video display screen 14 is preferably pivotally mounted to the housing 20 such that the display screen 14 can be pivoted away from the housing 20 when viewing is desired and toward the housing 20 when storage of the screen 14 is desired. The vehicle docking station 22 releasably receives the housing unit 20.

The information retrieval device 12 is preferably a component that is capable of receiving a removable storage medium 24 and reading entertainment information stored on the medium 24. Particularly preferable, the information retrieval device 12 comprises a component capable of receiving and reading a standard type of storage media. As illustrated in the figure, the information retrieval device 12 preferably comprises a DVD (digital video disk) drive. In this embodiment, the removable storage medium 24 comprises a DVD. Alternatively, the information retrieval device 12 can comprise a compact disk (CD) drive, a CD-ROM drive, a removable or fixed hard drive, a videocassette drive, or any other suitable component. The removable storage medium 24 will of course be appropriate for the type of information retrieval device 12 utilized.

The video display screen 14 comprises the video output device of the removable entertainment device 10. As such, the screen 14 displays images based on information contained on the removable storage medium 24 as read by the information retrieval device 12. The type of video display screen 14 employed will depend on the desired resolution and picture quality. LCD screens, such as those used in portable computers and personal entertainment systems, are suitable.

The electronics 18 are adapted to read the information stored on the removable storage medium 24 and to display an image based on this information onto the video display screen 14. As such, suitable electronics 18 include those typically utilized in the type of information retrieval device 12 employed in the removable entertainment device 10.

The housing unit 20 contains the information retrieval device 12 and the electronics 18. Preferably, the housing unit 20 encases the information retrieval device 12 and electronics 18 while still allowing the information retrieval device 12 to receive a removable storage medium 24 and the terminals of connector 34 to interact with external electrical components. Further, the housing unit 20 preferably mounts the video display screen 14 in a manner that allows the screen 14 to pivot between first and second positions. In the first position, the screen 14 is preferably positioned directly adjacent the housing 20 such that the image 26 cannot be viewed on the screen. In a second position, the screen 14 is preferably positioned substantially perpendicular to the length of the housing 20 such that the image can be optimally viewed. Any suitable structural interaction between the housing 20 and video display screen 14 that achieves this pivotal relationship can be utilized.

The vehicle docking station 22 is able to releasably receive the housing unit 20. The vehicle docking station 22 also preferably contains fasteners for attaching the bracket 22 to the vehicle, such as at the roof or ceiling of the vehicle. In addition, the vehicle docking station 22 preferably defines one or more electrical connectors 44 that are in electrical communication with at least a power supply 46 and, either directly or indirectly, one or more speakers 48 of the vehicle. Preferably, the electrical connector 44 comprises conductive flanges defined by the docking station 22. Alternatively, the electrical connector 44 can comprise terminals of a pigtail connector or another suitable connector passed through an opening defined by the docking station 22.

Preferably, the electrical connector 44 is positioned such that it frictionally engages the terminals of connector 34 as the housing unit 20 is received by the vehicle docking station 22. The electrical connector 44 and connector 34 are in electrical communication with each other, thereby placing the electronics 18 in electrical communication with the power supply 46 and vehicle audio system 48, when the housing unit 20 is fully received by the vehicle docking station 22.

When the housing unit 20 is not seated in the vehicle docking station 22, the removable entertainment device 10 is preferably capable of acting as a self contained entertainment device. Accordingly, the removable entertainment device 10 can further include an internal power supply 50 and an audio output component 52. The internal power supply 50 can comprise any suitable power supply, such as a rechargeable battery. Also, the audio output component 52 can comprise any suitable audio output device, such as a wired ready jack or wireless headphone transmitter, an internal speaker, or a speaker jack.

Figure 2:
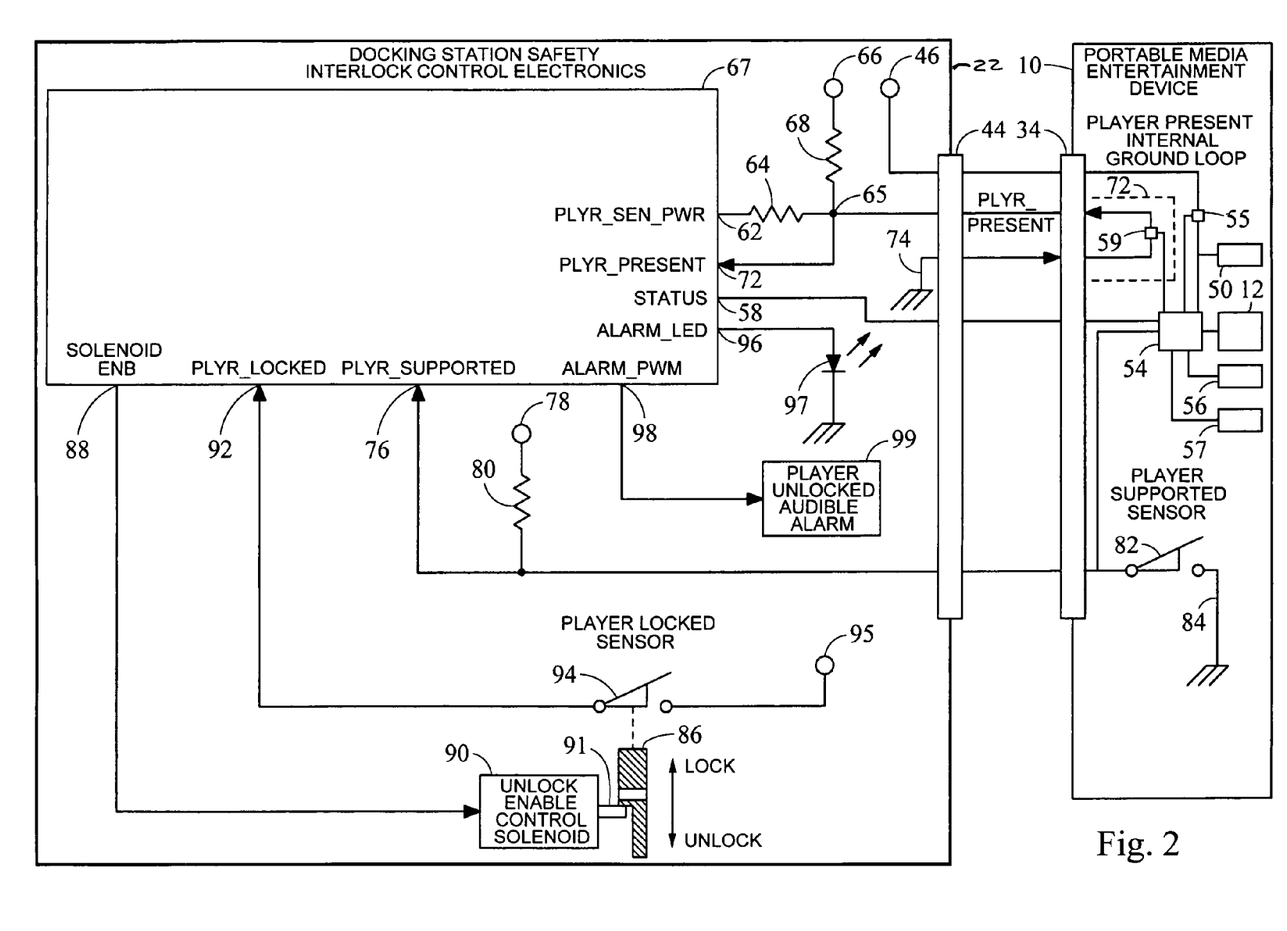
FIG. 2 is a schematic view of a media player in accordance with the present invention.

Now referring to FIG. 2, a schematic view of the removable entertainment device 10 and the docking station 22 are provided. The docking station 22 includes a controller 60 that monitors and controls operation of the docking station 22. The controller 60 is in electrical communication with the removable entertainment device 10. More specifically, the controller 60 is in electrical communication with a controller 54 configured to monitor and control operation of the removable entertainment device 10. Controller 60 and controller 54 communicate control information across a status line 58. Accordingly, all of the input or output information from controller 60 may be made available to controller 54 and all of the input or output information of controller 54 may be made available to controller 60 over the status line 58. The controller 54 in the removable entertainment device 10 may manipulate the information retrieval device 12 to retract or eject media, as well as, access data therefrom. The controller 54 may retract or eject the removable storage medium 24 based on a number of factors. More particularly, the controller 54 may retract or eject removable storage medium 24 based on a signal indicative that the removable entertainment device 10 may be moved. Such signals include but are not limited to signals from a screen closure sensor 56, a movement sensor 57, a power disconnection sensor 55, a player supported sensor 82, a player present sensor 59, or any combination thereof. In addition, the controller may suppress ejection of the media based on the aforementioned signals.

Controller 54 is located in the removable entertainment device and is in electrical communication with the information retrieval device 12. The removable entertainment device 10 is connected to the docking station 22 through electrical connector 34 and electrical connector 44. Accordingly, the removable entertainment device 10 is connected to a power supply 46 in the docking station 22. The power supply 46 may provide power for operation of the removable entertainment device 10, as well as charging of the internal power supply 50. The power sensor 55 is in electrical communication with the power supply 46 and may provide a signal to the controller 54 when the power supply 46 is disconnected from the removable entertainment device 10. In a similar fashion, a player present sensor 59 is in communication with a player present circuit 65 of the docking station 22 and provides a signal to the controller 60 when the player present circuit is disconnected from the portable media device 10. The removable entertainment device 10 includes a screen closure sensor 56 and a movement sensor 57 in electrical communication with the controller 54. The screen closure sensor 56 provides a signal to the controller 54 when the screen 14 is closed or in the first position indicative of the removable entertainment device being removed from the docking station 22. Similarly, the motion sensor 57 will detect motion of the removable entertainment device 10 and signal the controller 54 to retract any removable storage media protruding from the information retrieval device 12. The system may, in another embodiment, also check the information retrieval device 12 for a media present signal. As such, the controller 54 may decide in a slot load system to retract the media based on a signal from the screen closure sensor 56, the movement sensor 57, the power disconnection sensor 55, the player supported sensor 82, the player present sensor 59, or any combination thereof, unless the media present signal indicates no media is present.

The controller 60 includes a player sense power output 62 which is connected to a first end of resistor 64. The other end of resistor 64 is connected to the removable entertainment device 10 through node 65. Node 65 is connected to a power source 66 through a pull up resistor 68. A player present input 70 of the controller 60 is also in communication with node 65. Accordingly, if the removable entertainment device 10 is not connected to the docking station 22, the player present input 70 is pulled high by the power source 66. Alternatively, when the removable entertainment device 10 is present, node 65 is pulled to a reference voltage, such as ground 74 through the removable entertainment device 10. Node 65 is connected to the ground 74 through a ground loop in the player present circuit 72.

In addition, the controller 60 includes a player supported input 76. The player supported input 76 detects whether pressure is being applied to the removable entertainment device 10. If the removable entertainment device 10 is received into the bottom of the docking station 22 as shown in FIG. 1, the removable entertainment device 10 will need to be supported when released by the docking station 22 to prevent dropping of the removable entertainment device 10. Support can be provided by an occupant pushing upward on the removable entertainment device 10 prior to release by the docking station 22. This support may be measured by a pressure sensor 82, such as a pressure sensitive switch interfaced with the removable entertainment device 10. The player supported input 76 is connected to a power source 78 through a pull up resistor 80. The player supported input 76 is also connected to the pressure sensor 82 in the removable entertainment device 10 through connectors 34 and 44. If pressure is applied to the removable entertainment device 10, the pressure sensor 82 connects the player supported input 76 to a reference voltage, such as ground 84. In addition, the pressure sensor 82 is in electrical communication with the controller 54 allowing the information retrieval device 12 to retract the removable storage media 24 based on a signal from the pressure sensor 82.

To control whether the removable entertainment device 10 is locked into the docking station 22, a solenoid enable output 88 is provided. The solenoid enable output 88 controls a solenoid 90, thereby moving a pin 91. The pin 91 is biased to engage a latch 86 preventing movement of the latch 86. The latch 86 engages the removable entertainment device 10 preventing it from being released by the docking station 22. The solenoid enable output 88 is configured to activate the solenoid 90 thereby disengaging the pin 91 and allowing movement of the latch 86 when the removable entertainment device 10 is supported. For example, the controller 60 may check the player supported input 76 to determine if the removable entertainment device 10 is supported prior to allowing movement of the latch 86. Accordingly, the removable entertainment device 10 will not be released from the docking station 22 unless sufficient support is provided to prevent the removable entertainment device 10 from falling. A player locked input 92 is also provided by the controller 60. The player locked input 92 is connected to a player locked sensor 94 such as a switch. The player locked sensor 94 is configured to determine if the latch 86 is in the locked position. If the latch 86 is not in the locked position, the player locked sensor 94 connects a voltage source 96 to the player locked input 92 to inform the controller 60 that the latch 86 has been moved to the unlocked position thereby releasing the removable entertainment device 10 from the docking station 22.

In addition, the controller 60 includes optical alarm output 96 to provide an optical warning. The optical alarm output 96 may be connected to an illumination device such as a LED 97. The controller may activate the optical alarm output 96 causing blinking of the LED 97 based on an error condition perceived by the controller 60. In addition, the optical alarm output may be in communication with a display or vehicle network to indicate an error has occurred and provide information about the error. The error condition may include such things as moving the player or ejecting the media when the player is in a locked status. In one example, the controller can determine the player locked status based on the player locked sensor 94 indicating the latch 86 is in an unlocked position when the player supported input 76 indicates the removable entertainment device 10 is not supported.

Further, an audio alarm output 98 is included in the controller 60 to provide an audio warning. The audio alarm output 98 is in electrical communication with an audio output device 99, such as a speaker or vehicle audio system. Accordingly, the audio alarm output 98 may take the form of a pulse width modulator in the case of a speaker or may include a more complex status message in the case of the vehicle audio system.

Figure 3:
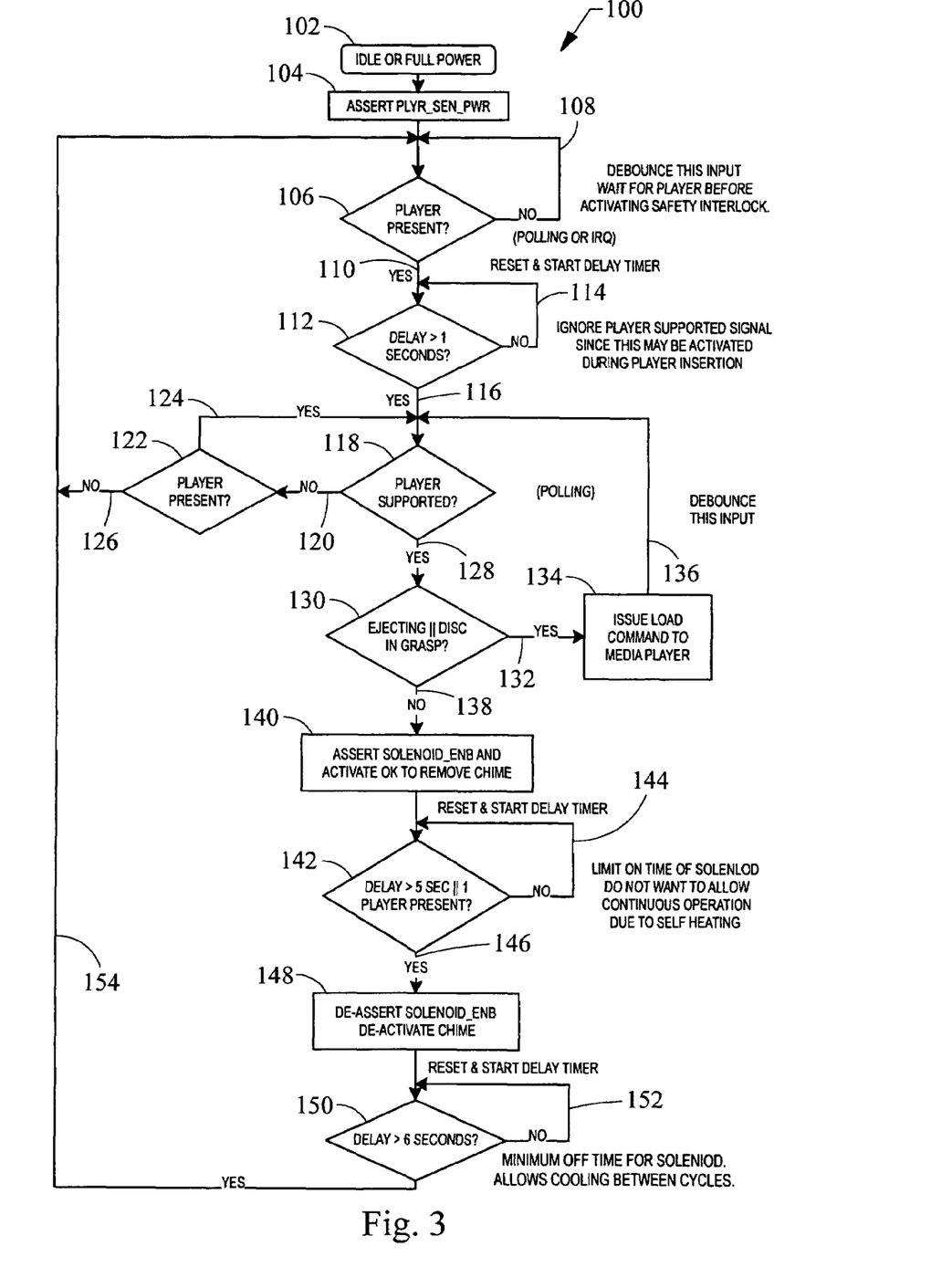
FIG. 3 is a flow chart illustrating a method to prevent media damage for a dockable system in accordance with the present invention.

Now referring to FIG. 3, a method 100 for releasing the removable entertainment device 10 from the docking station 22 is provided. In block 102, the controller 60 determines if the vehicle is in idle or full power mode, the player power output 62 is asserted as denoted by block 104. In block 106, the controller 60 determines if the removable entertainment device 10 is present based on the player present input 70. The player present input 70 may be monitored by the controller 60 via a polling routine or through an interrupt driven request. If the player is not present, the logic follows line 108 and loops back to block 106 until the player is present. When the player is present, the logic follows line 110 to block 112. In block 112, the controller 60 determines whether a one second delay has been met. If a one second delay has not been met, the logic follows line 114 back to block 112 until the delay has been met. The controller 60 may provide the capability to configure any of the delays within a range, for example, between one and ten seconds. If the delay is met, the logic flows along line 116 to block 118.

In block 118, the controller 60 determines whether the player is supported via the player supported input 76. If the removable entertainment device 10 is not supported, the logic follows along line 120 and the controller 60 determines if the removable entertainment device 10 is present as denoted by block 122. The controller 60 determines if the removable entertainment device 10 is present based on the player present input 70. If the player is not present, the logic flows along line 126 back to block 106 where the method 100 loops until the removable entertainment device 10 becomes present. If the logic in block 122 determines the removable entertainment device 10 is present, the logic flows along line 124 back to block 118, thereby forming a loop until the removable entertainment device 10 is supported. If the removable entertainment device 10 is supported, the logic flows along line 128 to block 130.

In block 130, the controller 60 determines whether the information retrieval device 12 is currently ejecting or if the removable storage medium 24 is in the slot of the information retrieval device 12. If the information retrieval device 12 is ejecting or the removable storage medium 24 is in the slot, the logic flows along line 132 to block 134. In block 134, a load command is issued to the information retrieval device 12 to retract the removable storage medium 24 into the information retrieval device 12. Thereafter, logic flows along line 136 to block 118. Alternatively, if the information retrieval device 12 is not ejecting and the removable storage medium 24 is not in the slot as determined by block 130, the logic flows along line 138.

In block 140, the controller 60 asserts the solenoid enable output 88 and activates a chime indicating the removable entertainment device 10 is ready to be removed. In block 142, the controller 60 determines if a five second delay has been met or if the removable entertainment device 10 is not present as determined by the player present input 70. If the timed delay has not been met and the removable entertainment device 10 is present, the logic flows along line 144 back to block 142. The delay is to limit the "on time" of the solenoid 90 to reduce heating caused by continuous solenoid operation. If the delay is met or the removable entertainment device 10 is no longer present, the logic flows along line 146 to block 148.

In block 148, the controller 60 de-asserts the solenoid enable output 88 and deactivates the remove chime. In block 150, the controller 60 determines whether a delay time has been met. If the delay time has not been met, the logic flows along 152 back to block 150 until the timed delay has been met. The timed delay is provided to allow cooling of the solenoid between cycles. When the timed delay has been met in block 150, logic flows along line 154 back to block 106 where the method is continued.

Figure 4:
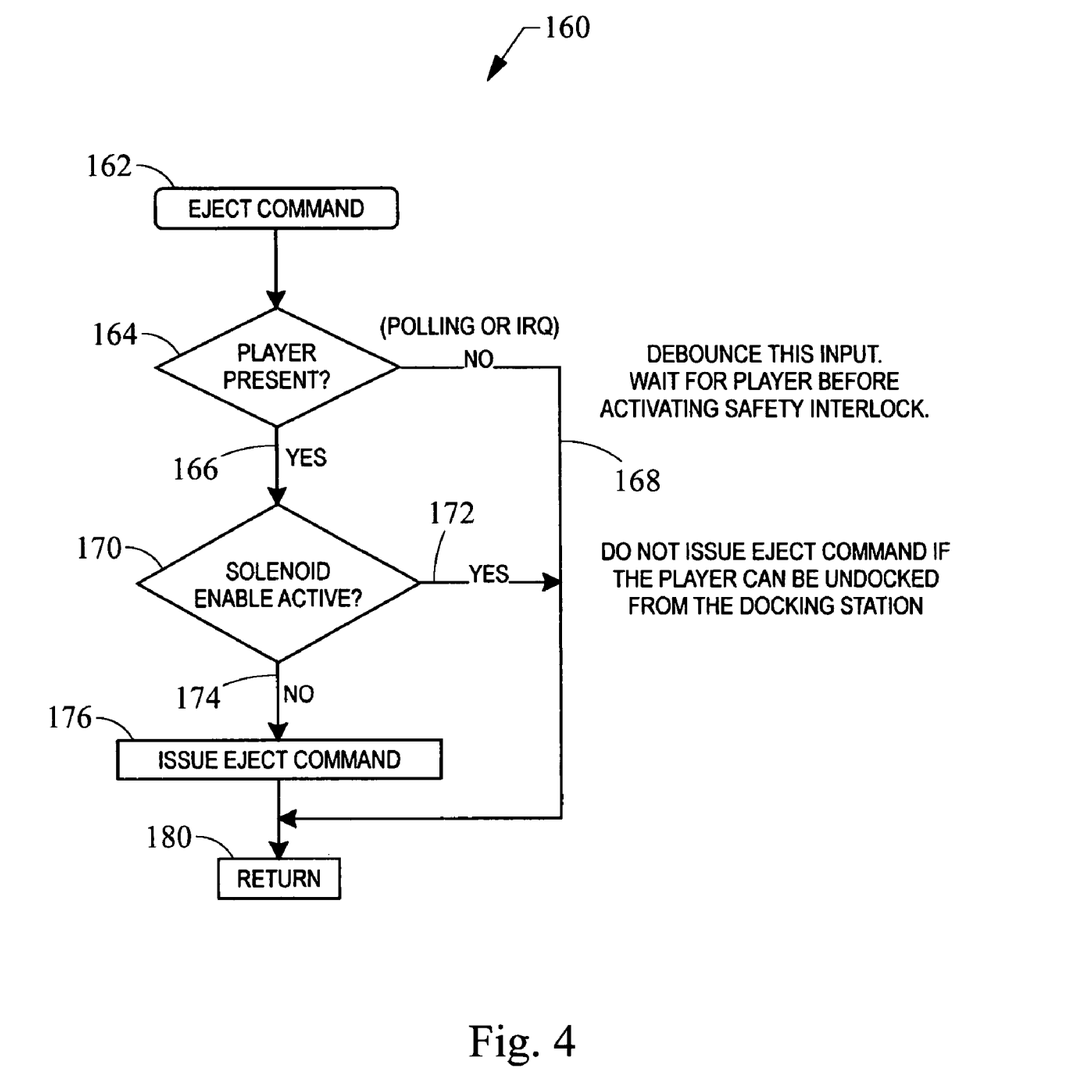
FIG. 4 is a flow chart of an eject command in accordance with the present invention.

Now referring to FIG. 4, a method 160 for ejecting removable storage media from the information retrieval device 12 is provided. In block 162, the controller 60 determines to issue an eject command. In block 164, the controller 60 determines if the removable entertainment device 10 is present based on the player present input 70 via polling or an interrupt driven request. If the removable entertainment device 10 is not present, the logic flows along line 168 to block 180. If the controller 60 determines the removable entertainment device 10 is present, the logic flows along line 166 to block 170.

In block 170, the controller 60 determines whether the solenoid enable output 88 is active. If the solenoid enable output 88 is active, the latch 86 may be moved to release the removable entertainment device 10 from the docking station 22. As previously mentioned, this may cause damage to the removable storage medium 24 if the removable storage medium 24 is extending from the slot through the hole in the docking station 22. As such, if the solenoid enable is active in block 170, the logic flows along line 172 to block 180. If the solenoid enable output 88 is not active in block 170, the logic flows along line 174 to block 176. In block 176, the eject command is issued to the information retrieval device 12 allowing the removable storage medium 24 to be ejected therefrom. After the removable storage medium 24 is ejected, the logic flows to block 180 where the method is ended and the logic is returned to the calling routine.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A system compromising:
   a removable entertainment device including an information retrieval device, the information retrieval device being configured to receive removable media and access data therefrom, a controller in electrical communication with the information retrieval device, wherein the controller is configured to retract the removable media into the information retrieval device when the controller receives a signal indicative that the removable entertainment device will be moved; and
   a screen closure sensor and wherein the controller is configured to receive the signal from the screen closure sensor causing retraction of the removable media when the screen is closed.

2. The system according to claim 1, further comprising a movement sensor and wherein the controller is configured to receive the signal from the movement sensor causing retraction of the removable media when motion of the removable entertainment device is detected.

3. The system according to claim 1, wherein the controller is configured to retract the media into the information retrieval device based on the signal and a media present signal.

4. The system according to claim 1, further comprising a warning device configured to provide a user warning based on a player locked status.

5. The system according to claim 4, wherein the warning is an audio warning.

6. The system according to claim 4, wherein the warning is an optical warning.

7. A system comprising:
   a removable entertainment device including an information retrieval device, the information retrieval device being configured to receive removable media and access data therefrom, a controller in electrical communication with the information retrieval device, wherein the controller is configured to retract the removable media into the information retrieval device when the controller receives a signal indicative that the removable entertainment device will be moved; and
   wherein the controller is configured to receive the signal from the power circuit causing retraction of the removable media when power is disconnected to the removable entertainment device.

8. A system comprising:
   a removable entertainment device including an information retrieval device, the information retrieval device being configured to receive removable media and access data therefrom, a controller in electrical communication with the information retrieval device, wherein the controller is configured to retract the removable media into the information retrieval device when the controller receives a signal indicative that the removable entertainment device will be moved;
   a docking station configured to receive the removable entertainment device; and
   a player supported sensor, wherein the controller is configured to receive the signal from the player supported sensor causing retraction of the removable media when the player supported sensor senses a force applied to the removable entertainment device from below to prevent the removable entertainment system from falling out of the docking station.

9. The system according to claim 8, further comprising a player present sensor, configured to provide a player present signal to the controller when the removable media is located within the information retrieval device.

10. The system according to claim 8, wherein the docking station includes a latch configured to lock the removable entertainment device in the docking station.

11. A system comprising:
    a removable entertainment device including art information retrieval device, the information retrieval device being configured to receive removable media and access data therefrom, a controller in electrical communication with the information retrieval device;
    a docking station configured to receive the removable entertainment device;
    wherein the controller is configured to retract the removable media into the removable entertainment device when the controller receives a signal indicative that the removable entertainment device will be removed from the docking station; and
    a screen closure sensor and wherein the controller is configured to receive the signal from the screen closure sensor causing retraction of the removable media when the screen is closed.

12. A system comprising: a removable entertainment device including an information retrieval device, the information retrieval device being configured to receive removable media and access data therefrom, a controller in electrical communication with the information retrieval device;
    a docking station configured to receive the removable entertainment device;
    wherein the controller is configured to retract the removable media into the removable entertainment device when the controller receives a signal indicative that the removable entertainment device will be removed from the docking station; and
    a power circuit, wherein the controller is configured to receive the signal from the power circuit causing retraction of the removable media when power is disconnected to the removable entertainment device.

13. The system according to claim 12, further comprising a movement sensor and wherein the controller is configured to receive the signal from the movement sensor causing retraction of the removable media when motion of the removable entertainment device is detected.

14. The system according to claim 12, further comprising a player present sensor, configured to provide a player present signal to the controller when the removable media is located within the information retrieval device.

15. The system according to claim 12, wherein the docking station includes a latch configured to lock the removable entertainment device in the docking station.

16. A system comprising:
    a removable entertainment device including an information retrieval device, the information retrieval device being configured to receive removable media and access data therefrom, a controller in electrical communication with the information retrieval device;

a docking station configured to receive the removable entertainment device;

wherein the controller is configured to retract the removable media into the removable entertainment device when the controller receives a signal indicative that the removable entertainment device will be removed from the docking station; and a player supported sensor, wherein the controller is configured to receive the signal from the player supported sensor causing retraction of the removable media when the player supported sensor senses a force applied to the removable entertainment device from below to prevent the removable entertainment system from falling out of the docking station.

* * * * *

UNITED STATES PATENT AND TRADEMARK OFFICE
CERTIFICATE OF CORRECTION

PATENT NO. : 7,484,026 B2
APPLICATION NO. : 11/287687
DATED : January 27, 2009
INVENTOR(S) : Robert J. Burnham et al.

It is certified that error appears in the above-identified patent and that said Letters Patent is hereby corrected as shown below:

On the Title Page

Item [56] On page 2, column 2, line 7, before "Georgis" delete "1/2008" and substitute --1/2006-- in its place.

In the Claims

In column 8, claim 11, line 20, after "device including" delete "art" and substitute --an-- in its place.

Signed and Sealed this

Second Day of June, 2009

JOHN DOLL
*Acting Director of the United States Patent and Trademark Office*